June 10, 1969 F. S. ALLINQUANT 3,448,665
SLIDING SEAL ARRANGEMENTS
Filed Dec. 19, 1966 Sheet 1 of 2
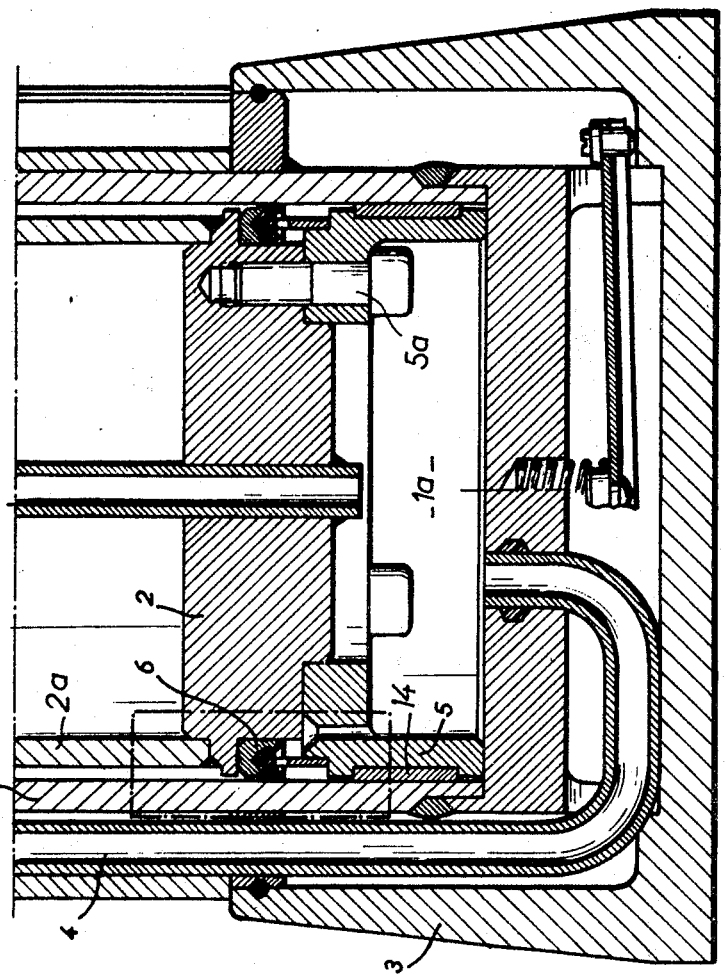
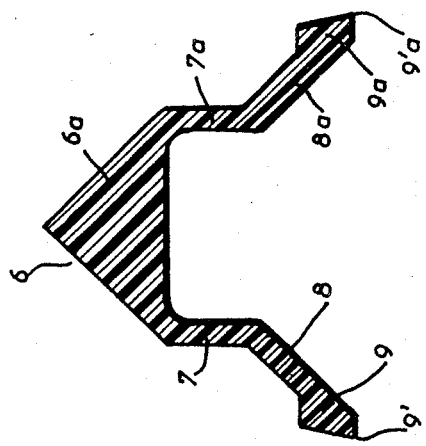

United States Patent Office 3,448,665
Patented June 10, 1969

3,448,665
SLIDING SEAL ARRANGEMENTS
Fernand Stanislas Allinquant, 53 Ave. le Nôtre,
Hauts-de-Seine, Sceaux, France
Filed Dec. 19, 1966, Ser. No. 602,919
Claims priority, application France, Dec. 22, 1965,
43,418
Int. Cl. F01b *31/00;* F16j *9/12, 9/20*
U.S. Cl. 92—181                         6 Claims

ABSTRACT OF THE DISCLOSURE

Sealing arrangement for a pressure chamber having a wall in sliding engagement with a cylindrical surface, comprising a seal member having a seal body and an annular lip comprising a portion which extends axially to provide flexibility and a portion flaring laterally and forming a bead at its rim for engagement with the cylindrical surface, and a seal retaining portion of the wall, forming a flange between the lip and the cylindrical surface for abutting the bead axially.

---

This invention relates to an annular seal arrangement which is used to provide a seal between two elements which are in coaxial sliding relation with one another. It relates more particularly, but not exclusively, to a seal for use between the piston and cylinder of a hydraulic pit prop.

Hydraulic pit props are basically simple hydraulic jacks which serve to hold up the roofs of mine galleries. Such jacks are collapsed for removal by rapidly discharging their compression chambers, using a suitable valve. In service, the pit props must yield under an earth pressure exceeding a certain load known as the "slip load."

Due to the operating conditions, seals in hydraulic pit props must operate effectively at pressures in the order of up to 400 kg./cm.² and should introduce the least possible degree of friction, in particular so that rapid collapse of the prop can be effected.

The seals currently employed in pit props are of the toroidal kind or of the double-lip kind similar to the old pressed leather type.

However, these seals are not entirely satisfactory. Toroidal seals require extremely accurate production of the sliding surfaces; furthermore, large-diameter toroidal seals have a tendency to twist, giving rise to leakage. Conventional double-lip seals, highly satisfactory for high pressure work, have the drawback of introducing a high degree of friction which interferes with the accuracy of the sliding motion between the piston and cylinder; moreover, when made of conventional materials, they tend to take a permanent set under the high pressures encountered in hydraulic pit props.

Again, conventional types of seal tend to stick to the mating surface over which they are slidable, if the pressure is maintained for a fairly long time. However, for proper discharge of the pit prop, it is essential during collapse that as soon as the pressure drops the seal should revert to its initial shape so that it is immediately freed from the mating surface.

To overcome these drawbacks, in accordance with the present invention and in order to produce a seal between two elements which can have coaxial sliding motion in relation to one another, an annular seal of relatively hard material is used, this comprising a body arranged in a seating in one of the said elements, which body comprises at least one lip having a cylindrical portion linked through a truncate-conical portion to a foot portion which is supported against the edge of the said seating, the lip sliding over the other element with small clearance, of the order of one tenth of a millimetre for example, the foot being forcibly applied against said other element by the pressure acting upon it.

The material of the seal will preferably be a plastics material having good mechanical properties and a relatively high hardness, for example a polyamide or polytetrafluoroethylene, the latter being known commercially by the trademark "Teflon"; however, it is possible to use a metal on its own, or a metal and a plastics material, in the manufacture of the seal.

In a preferred embodiment of the invention, the seal is of the double-lip kind and is inserted into a seating formed in a support tightly fixed to one of the sliding elements.

The ensuing description, which relates to the accompanying drawings, will demonstrate without limitation how the invention may be put into effect.

In the drawings:

FIGURE 1 illustrates, in section, the lower part of a pit prop, equipped with a preferred arrangement of seal in accordance with the invention;

FIGURE 3 represents a section through the seal prior to assembly, i.e., in the free state thereof.

Figure 2:
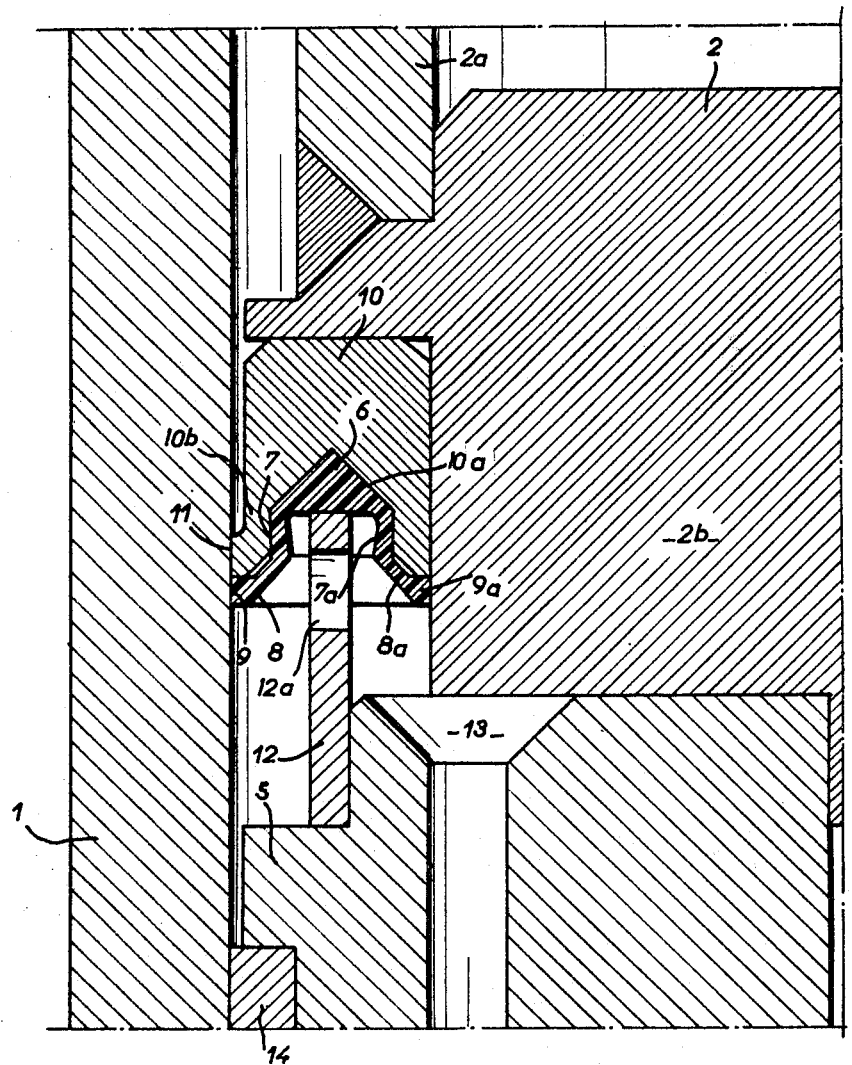
FIGURE 2 is a view, on a larger scale, of that part of FIGURE 1 which is boxed in by a chain-dotted line, this showing the assembly of the seal in relation to the piston and the cylinder.

In accordance with FIGURE 1, the pit prop comprises a cylinder 1 and a piston 2, the latter being integral with a tubular piston rod 2a; the cylinder is fixed to a support 3, a pipe arrangement 4 supplying pressurised fluid to the compression chamber 1a formed between the piston 2 and the base of the cylinder 1.

The sliding motion of the piston within the cylinder is controlled by a friction segment 14 lodged in an annular groove in a component 5 attached beneath the piston by screws 5a.

A seal 6 in accordance with the invention furnishes sealing between the piston and the cylinder. The detail of manner in which the seal is assembled is illustrated in FIGURE 2.

The seal 6 is a solid of revolution and has a relatively thick annular body 6a and radially-inner and radially-outer annular lips, each of the latter having a cylindrical portion 7 (7a) extended by a truncate-conical portion 8 (8a) and terminating in a bead forming a shaped annular foot 9 (9a). Preferably, the seal will be made of a plastics material whose hardness measured on the Shore scale is greater than 85. The seal is attached in a seating 10a formed in a component 10 mounted on a cylindrical portion 2b of the piston 2.

In FIGURE 2 in particular, at the left, it will be seen that the lip 9 of the seal slides along the cylinder 1, and at the right, that the lip 9a provides a static seal against the piston 2.

The seating 10a in the component 10, which houses the seal, will preferably have exactly the same shape as the external shape of the seal 6 when the latter is in the free state (see FIGURE 3), and the thickness of this component 10, considered radially, is slightly less than the radial distance between the external faces 9' and 9'a, of the feet 9, 9a of the seal, when the latter is in the free state. If the seal 6 is introduced into the seating in the component 10 whilst the latter is separate from the piston and cylinder, the lips of the seal will be applied against the walls of the seating 10a and the annular feet 9 and 9a will project radially for some few tenths of a millimetre, respectively towards the exterior and towards the interior of the component 10.

The seal 6 being now in place on its support, the component 10 is press-fitted over the piston 2 and the cylindrical portion 2b of the piston forces out the foot 9a, causing the cylindrical portion 7a of the lip to flex so that part of it, and also part of the truncate-conical portion 8a, lift away from the wall of the seating 10a, as shown in FIGURE 2. The flexibility of the lip maintains the foot 9a in contact with the portion 2b of the piston. The seal 6 is held in place by a locating ring 12 carried on the component 5 already mentioned, this component being assembled beneath the piston 2 and attached to it by the screws 5a.

After the segment 14 has been positioned in its seating, the piston assembly is introduced into the open top end of the cylinder 1, so that the foot part 9 of the seal 6 is constrained inwards by the wall of said cylinder 1. The lip 7, 8 of the seal flexes and partially parts from the peripheral wall 10b of the seating 10a, in the manner explained hereinbefore in relation to the lip 7a, 8a, and the foot 9 is urged elastically into contact with the wall of the cylinder 1.

The component 5 is pierced from top to bottom by holes 13 and the cylindrical ring 12 contains transverse holes 12a. Pressurized fluid which is fed into the compression chamber 1a of the cylinder during operation can thus penetrate to the seal 6, passing through the holes 13 and 12a, and, owing to the elasticity of the seal, force the foot portions 9 and 9a into contact with the internal wall of the cylinder 1 (to give a good sliding seal) and into contact with the external wall of the piston 2b (to give a static seal), respectively.

At the side of the cylinder the peripheral wall 10b of the component 10 has an annular shoulder 11, which forms a cylindrical collar of low height, the clearance between this collar and the cylinder 1 being in the order of a tenth of a millimetre; this sliding shoulder 11 is necessary to prevent the foot portion 9 from extruding under the influence of the high pressure prevailing in the compression chamber. However, the inherent strength of the plastics material used is such as to enable this clearance in the order of a tenth of a millimetre to be used between the shoulder 11 and the cylinder, this making manufacture simpler than would be the case if a rubber seal were used. If in fact a rubber seal were used, the clearance between shoulder 11 and cylinder would have to be in the order of only a few hundredths of a millimetre.

Once the seal is in place, as illustrated in FIGURE 2, the portions 8 and 9 are very slightly lifted away from their points of support in the component 10, in the manner already explained; however, the degree to which they deform is limited.

Advantageously, the portions 7 and 8 of the seal 6 will have as thin a section as possible, consistent with the requirements of the molding or other manufacturing process. In practice, a thickness in the order of about 0.4 mm. will be employed; it has in fact been found that efficiency of sealing is not affected by this small thickness whereas the coefficient of friction, and above all the absence of sticking after long-term pressurising, are favourably influenced by such small thickness.

It should be mentioned that the application of the foot portions 9 and 9a against the walls of the cylinder 1 and against the cylindrical portion 2b of the piston, respectively, this ensuring a good seal, is achieved chiefly by the effect of the fluid pressure in the chamber 1a on the truncate-conical portions 8 and 8a of the lips of the seal, and more particularly on the portion in the vicinity of the wide bases of these truncate-conical parts. On the other hand, the cylindrical portions 7 and 7a are more or less exclusively involved in giving a flexing action to the lips 7, 8 and 7a, 8a, of the seal. In effect, the truncate-conical form of the portions 8 and 8a gives these a certain stiffness which prevents them from flexing as easily as the cylindrical portions 7 and 7a. However, it is the facility for flexing of the lips which enables the fluid pressure to forcibly apply the foot portions 9 and 9a against the cylinder and piston.

The efficiency of the seal, that is to say the ability of a seal 6 of given height to provide an adequate seal, in thus the greater the lower the height of the conical portions 8 and 8a, since the elastic distortion of the lips, and the urging of the foot portions into contact with the surfaces of cylinder and piston, are facilitated in this way.

The wall 10b, forming the shoulder 11 which supports the foot portion 9, should have adequate mechanical strength. However, as is not difficult to see from FIGURE 2, the thickness of the wall 10b will be the smaller the smaller the height of the truncate-conical portion 8 of the lip, in particular since it is desirable that the collar formed by the shoulder 11 should have the lowest possible height.

For this reason, it is advisable to employ a metal of very high strength for the manufacture at least of that portion of the piston which forms the wall 10b. In order not to use such material in a wasteful manner, it is advantageous to form the wall 10b on a component attached to the piston 2. In the embodiment described, this attachment component is the component 10. This is press-fitted over the body of the piston 2, i.e., in an unsealed manner; the purpose of the lip 7a, 8a, 9a, is to make this a sealed assembly.

From FIGURE 3, it will be noted that, in the free state of the seal, the surfaces 9' and 9'a of the foot portions which are designed to rest respectively against the piston and against the cylinder, are not disposed inherently to lie absolutely parallel to the walls of the piston or cylinder; a certain degree of rake in the portions 9 and 9a is in fact necessary so that the contact between the seal and the cylinder or piston, as the case may be, is necessarily effected at the surfaces 9' and 9'a.

It goes without saying that the embodiment described has been given simply by way of example and can be modified in various ways without departing from the scope of the invention defined by the appended claims.

In particular, it is possible to use a seal having a single lip only, in which case it is necessary to form the seating 10a in the body of the piston or, by some other means, to ensure that there is a seal between the said body of the piston and an attachment piece forming the seal seating.

Persons skilled in the art will understand immediately that it is possible to attach a seal in accordance with the invention to a cylinder other than a pit prop cylinder in order to give a seal between the same and a piston element, for example a plunger. The sealing arrangement in accordance with the invention is, moreover, not merely applicable to the sealing of pistons and cylinders, but can be used in other applications, and in particular to furnish a seal between two coaxially slidable piping elements.

I claim:

1. A sealing arrangement for a high pressure chamber having first and second coaxial walls mounted for axial movement of the first wall relative to a cylindrical surface of the second wall, comprising a seal member of flexible material having a seal body and an annular thin walled lip comprising a portion which extends axially to provide flexibility and a laterally flaring portion forming an annular bead at its rim; a seal retaining portion of the first wall having a recess adapted to accommodate the seal body and lip portions with the bead projecting axially in the chamber and engaging the cylindrical surface; and a peripheral flange of the seal retaining portion between the recess and the cylindrical surface for abutting the bead axially.

2. An arrangement as claimed in claim 1, wherein the seal member is made of a material having a Shore hardness higher than about 85, and the flange is adapted to define a radial clearance of about a tenth of a millimeter between the flange and the cylindrical surface.

3. An arrangement as claimed in claim 2, wherein said material is selected from the group consisting of the polyamides, polytetrafluorethylene and metals.

4. An arrangement as claimed in claim 1, wherein the first wall comprises a body member and an insert of high strength metal which forms at least the flange.

5. A device as claimed in claim 4, wherein said insert is an annular insert which forms the seal retaining portion, and the seal member is an annular member having a further lip adapted to engage said body member.

6. A device as claimed in claim 5, comprising a seal holding component having a sleeve portion adapted to engage the seal body and a guide portion adapted to slidably engage the cylindrical surface, means for fastening the component to the first wall, and passage means in said component leading from the chamber to the inner and outer sides of the sleeve portion.

References Cited
UNITED STATES PATENTS

| | | |
|---|---|---|
| 2,420,929 | 5/1947 | Buffington et al. _____ 277—205 |
| 2,521,692 | 9/1950 | Costello _____ 277—205 X |
| 2,684,119 | 7/1954 | Brown _____ 277—205 X |
| 2,815,970 | 12/1957 | Wallace _____ 277—205 X |
| 2,815,995 | 12/1957 | Young _____ 277—205 |
| 2,913,269 | 11/1959 | Bremer et al. _____ 277—205 X |
| 2,977,138 | 3/1961 | Brittain _____ 277—205 X |

CARROLL B. DORITY, Jr., *Primary Examiner.*

U.S. Cl. X.R.

92—240, 250; 277—79, 188, 205